(12) United States Patent
Pajerski

(10) Patent No.: US 7,576,157 B2
(45) Date of Patent: *Aug. 18, 2009

(54) AQUEOUS DISPERSIONS OF POLYURETHANE COMPOSITIONS WITH KETONE-HYDRAZIDE

(75) Inventor: Anthony D. Pajerski, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/829,390

(22) Filed: Jul. 27, 2007

(65) Prior Publication Data

US 2008/0027168 A1 Jan. 31, 2008

Related U.S. Application Data

(60) Provisional application No. 60/820,835, filed on Jul. 31, 2006.

(51) Int. Cl.
*C08G 18/06* (2006.01)
*C08G 18/08* (2006.01)
*C08F 283/04* (2006.01)

(52) U.S. Cl. ................. 524/589; 524/591; 525/453

(58) Field of Classification Search ......... 524/591, 524/589; 525/453
See application file for complete search history.

(56) References Cited

U.S. PATENT DOCUMENTS

| 4,598,121 | A | | 7/1986 | Disteldorf et al. |
| 4,983,662 | A | | 1/1991 | Overbeek et al. |
| 5,070,136 | A | | 12/1991 | Dersch et al. |
| 5,147,926 | A | * | 9/1992 | Meichsner et al. .......... 524/591 |
| 5,571,861 | A | | 11/1996 | Klein et al. |
| 5,623,016 | A | | 4/1997 | Klein et al. |
| 6,063,861 | A | | 5/2000 | Irle et al. |
| 6,462,127 | B1 | * | 10/2002 | Ingrisch et al. ............. 524/589 |
| 2002/0028875 | A1 | * | 3/2002 | Anderle et al. ............. 524/591 |
| 2005/0171315 | A1 | * | 8/2005 | Wakabayashi et al. ........ 528/26 |
| 2006/0089453 | A1 | * | 4/2006 | Pajerski ...................... 524/589 |
| 2006/0264568 | A1 | * | 11/2006 | Pajerski ...................... 524/591 |

FOREIGN PATENT DOCUMENTS

| EP | 0 367 051 A1 | 5/1990 |
| WO | 2006/047746 A1 | 5/2006 |

OTHER PUBLICATIONS

Motawie, A.M. et al., "Some Epoxidized Polyurethane and Polyester Resins Based on Linseed Oil", Journal of Applied Polymer Science, Mar. 28, 1995, pp. 1725-1732, vol. 55, No. 13.

* cited by examiner

*Primary Examiner*—Mark Eashoo
*Assistant Examiner*—Noah Frank
(74) *Attorney, Agent, or Firm*—Samuel B. Laferty; Joe A. Powell; Thoburn T. Dunlap

(57) ABSTRACT

An aqueous dispersion of polyurethane composites is made by forming a dispersion of urethane prepolymer or polymer and ketone functional molecule by dispersing them in an aqueous media and adding a hydrazine functional molecule. When the ketone functional molecule is derived from levulinic acid and epoxidized vegetable oil, the resulting urethane dispersion has enhanced coalescence with less need for coalescing aids.

20 Claims, No Drawings

AQUEOUS DISPERSIONS OF POLYURETHANE COMPOSITIONS WITH KETONE-HYDRAZIDE

CROSS REFERENCE

This application claims priority from U.S. Provisional Application Ser. No. 60/820,835 filed on Jul. 31, 2006.

FIELD OF THE INVENTION

This invention relates to aqueous dispersions of polyurethane including co-reactive molecules/oligomers of a) a ketone functional moiety/molecule and b) a hydrazine functional moiety useful in a variety of applications including coatings such as wood floor coatings. Co-reactive components would offer the benefit of high performance at low or reduced volatile organic component emission.

BACKGROUND OF THE INVENTION

U.S. Pat. No. 4,598,121 disclosed a method for preparing an aqueous polyurethane dispersion, comprising (a) preparing a prepolymer with free NCO groups by reacting an aliphatic or cycloaliphatic polyisocyanate with a polyol, and an anionic compound; (b) dispersing said prepolymer in water; (c) reacting said water-dispersed prepolymer with a diamino hydrazide as a chain lengthening agent; and (d) reacting the prepolymer of step (c) in said dispersion with formaldehyde to effect crosslinking.

U.S. Pat. No. 4,983,662 disclosed an aqueous self crosslinkable coating composition comprising an aqueous dispersion of at least one polyurethane and having hydrazine (or hydrazone) functional groups and carbonyl functional groups disposed therein to provide a self crosslinking reaction, in which the polyurethane polymer takes part, via azomethine formation during and/or after film formation.

U.S. Pat. No. 5,070,136 disclosed an aqueous polymer dispersions essentially containing a copolymer of a) from 85 to 98.5% by weight of methacrylates, b) from 0.5 to 4% by weight of acrylic acid and/or methacrylic acid, c) from 0.5 to 4% by weight of acrylamide and/or methacrylamide, d) from 0.5 to 4% by weight of an $\alpha,\beta$-ethylenically di-unsaturated or polyunsaturated compound and e) from 0 to 3% by weight of a carbonyl-containing $\alpha,\beta$-ethylenically unsaturated compound, a process for their preparation, and their use for coating wood.

U.S. Pat. Nos. 5,571,861 and 5,623,016 disclosed an aqueous, auto crosslinking polymer dispersion binder(s) comprising polyhydrazides and carbonyl-containing polyurethane-vinyl hybrid polymers and also, if desired, conventional additives are useful in base coatings, aqueous coatings, adhesives and printing inks.

U.S. Pat. No. 6,063,861 disclosed a storage stable, aqueous polyurethane-polyacrylate hybrid dispersions, which are self crosslinkable at room temperature and contain A) 10 to 95 wt. %, of a polyurethane dispersion, B) 5 to 90 wt. %, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine, which is present in an equivalent ratio of amino groups to acetoacetoxy groups of 0.5:1 to 1.1:1, in which the wt. % of components A) and B) add up to 100, based on the total weight of components A) and B). The invention also relates to one-component coating compositions containing these hybrid dispersions as binders and to substrates coated with these coating compositions.

SUMMARY OF THE INVENTION

Aqueous dispersions of polyurethane, including a) ketone functional molecule and a co-reactive b) hydrazine functional moiety (e.g., hydrazide, hydrazone, ketoxime) are described. The polyurethane can be made by any conventional formation process that can also include the addition of the ketone functional moiety and hydrazine functional moiety already discussed. The ketone molecule and hydrazine functional moiety help enhance liquid properties prior to film formation and/or help final film properties after final film formation. A preferred ketone molecule is the reaction product of levulinic acid with epoxides of linseed or soybean oil.

Isocyanates are reacted with active hydrogen containing compounds such as polyols to form urethane prepolymers. The prepolymers are further reacted to eventually form polyurethane (urethane polymers). This prepolymer is in one embodiment neutralized by reaction with at least one neutralizing agent, dispersed in aqueous medium, and optionally chain extended by reaction with at least one of water, inorganic or organic polyamine having an average of about 2 or more primary and/or secondary amine groups, or combinations thereof. The ketone functional moieties are introduced into the reaction mixture at any time during prepolymer or polyurethane formation when they can be uniformly dispersed, in one embodiment this is before the prepolymer is dispersed in water. The hydrazine functional moieties are typically added after dispersion and/or chain extension, though they could be added earlier with chain extender or co-extender.

DETAILED DESCRIPTION OF THE INVENTION

In accordance with the invention, the polyurethane or its prepolymer, the ketone functional molecule and the hydrazine functional moiety dispersed in an aqueous medium to form a dispersion of composite particles composed of the polyurethane or its prepolymer, the ketone functional molecule, and the hydrazine functional moiety. The order of addition of these components to the final composition varies depending on when it is easiest to add each component and when addition can be achieved without undesirable side reactions.

Definitions

In this document, "polyurethane" is a generic term used to describe polymers including oligomers (e.g., prepolymers) which contain multiple urethane groups, i.e., —O—C(=O)—NH—, regardless of how they are made. As well known, polyurethanes can contain additional groups such as urea, allophanate, biuret, carbodiimide, oxazolidinyl, isocyanurate, uretdione, ether, ester, carbonate, etc., in addition to urethane groups. Typically, the prepolymers will be above 1,000 or 2,000 Daltons in number average molecular weight and if chain extended during the processing can reach number average molecular weights in the millions of Daltons.

"Wt. %" means the number of parts by weight of monomer per 100 parts by weight of polymer, or in the case of a polymer and additives blend the number of parts by weight of ingredient per 100 parts by weight of composition or material of which the ingredient forms a part.

"Aqueous medium" means a composition containing a substantial amount of water. It may contain other ingredients as well.

The "final polyurethane product" refers to the polyurethane in the aqueous dispersion product of this invention. When the polyurethane prepolymer is chain extended, the final polyurethane product is this chain extended polymer. When the polyurethane prepolymer is not chain extended, the final polyurethane product is the prepolymer itself.

"Substantial absence of surfactant" as well as "substantially free of residual surfactant" in reference to a dispersion means that the dispersion is made without intentionally including a surfactant (a possibility in some embodiments but not required in all embodiments) for suspending or dispersing the dispersed phase of the dispersion. Surfactant in this context refers to molecules whose primary function is to stabilize particles or go to interfaces between phases and modify the interfacial tension at those interfaces. The term surfactant does not include water dispensability enhancing compounds that are chemically reacted into a polyurethane or urethane prepolymer.

The ketone functional molecule and hydrazine functional moiety can promote inter particle penetration and coalescence during particle coagulation of the polyurethane dispersion during film formation. If a film or polymer layer is desired in the final application, good coalescence promotes optimal physical property of strength, film integrity, etc. Desirably, the reaction between the ketone functional molecule and hydrazine functional moiety is delayed until after particle coagulation and coalescence, but the technology is not limited thereby. Desirably, the ketone functional molecule and the hydrazine functional moiety react to form azomethine linkages as taught in U.S. Pat. No. 4,983,662. Desirably, this reaction between the ketone groups of the ketone functional molecule and the hydrazide groups of the functional moiety proceeds at a reasonable rate at 20-25° C. such that lower molecular weight species associated with these moieties are converted at 20-25° C. (ambient drying temperature) to higher molecular weight and/or possibly crosslinked species that aid rather than detract from polymer hardness, strength, solvent resistance, and related properties of wear resistance.

Ketone Functional Molecules/Oligomers (Moieties)

The ketone functional moieties/molecule and hydrazine functional moieties of this disclosure do not need to be attached to the primary polymer chains (e.g., urethane or possibly acrylic polymer in a hybrid system) and may chain extend and/or crosslink lower molecular weight species rather than crosslinking polymer chains (as disclosed in the prior art) in order to improve the properties of a polyurethane composition. In an embodiment, the ketone functional molecule is made from a reaction of a C3-C20 ketone or aldehyde containing carboxylic acid with a polyepoxy compound such as epoxidized triglyceride oil (for example, epoxidized soybean oil or linseed oil), other epoxidized polyesters, or an epoxidized polyol.

The reaction between the C3-20 ketone or aldehyde containing carboxylic acid and the polyepoxy compound is desirably catalyzed to reduce the reaction time and reaction temperature. Catalysts include trialkylamines, phosphines such as triphenylphosphine, chromium catalysts, imidazoles, such as N-methylimidazole, etc. In one embodiment, the C3-C20 (i.e., having 3 to 20 carbon atoms) ketone or aldehyde containing carboxylic acid is a C3 to C10 species. In another embodiment, it is a C3 to C6 species. In one embodiment, it comprises a ketone containing species. A preferred C3-C20 ketone or aldehyde containing carboxylic acid is levulinic acid (γ-ketovaleric acid; acetylpropionic acid, 4-oxopentanoic acid) or pyruvic acid (α-ketopropionic acid; acetylformic acid).

The triglyceride oils are unsaturated vegetable oils, animal fats, and synthetic triglycerides, which are generally considered to be derived from condensation reactions of various fatty acids and glycerol. While the triglycerides are often described as oils, they may be solids at room temperature. The higher the amount of unsaturation present, the higher the degree of epoxidation possible under similar reaction conditions. Reactions of these oils with unsaturation with strong oxidizers can convert the carbon to carbon double bond in the fatty acids to epoxides; peracetic acid being a common strong oxidizer for this purpose. Epoxidized vegetable oils are commercially available from companies such as Dow and Chemtura. The oxirane oxygen content is generally characterized from about 7-10 or 12% by weight. The oxirane oxygen value is determined by a nonaqueous potentiometric titrimetry using perchloric acid in the presence of tetraethylammonium bromide. Epoxidized soybean and linseed oils are both used as plasticizers and sometimes as acid scavengers.

In another embodiment, the epoxidized material reacted with a C3-C20 ketone or aldehyde carboxylic acid is a synthetic polyester formed from condensation reactions of one or more polyols and one or more mono or polycarboxylic acids. In one embodiment, this polyester is aliphatic polyester and generally has one or less urethane linkages. This polyester is desirably epoxidized similarly to the vegetable oil via a strong oxidizer reacting with unsaturation in the polyester. Desirably, one or more of the polyol or mono or polycarboxylic acid used to make the polyester was unsaturated, optionally with conjugated unsaturation. The polyol can have from 2 to 10 or 15 hydroxyl groups. In one embodiment, the polyol can be aromatic, alkyl substituted aromatic or aromatic substituted alkyl 6 to 20 carbon atoms. In another embodiment, the polyol can be aliphatic linear, branched, or cyclic with 2 to 20 carbon atoms. Aliphatic polyols are slightly preferred. Examples of polyols include pentaerythritol, dipentaerythritol, etc.; glycerol, polyglycerol, etc.; trimethylolpropane, neopentyl glycol, sorbitol, etc. In one embodiment, the polyol will have from 2 or 3 to about 6 hydroxyl groups. Generally, the polyol will be saturated. Generally, the carboxylic acids can be mono, di or polycarboxylic acids. They may be fatty acids such as derived from the hydrolysis of vegetable oils. The carboxylic acids desirably have from about 2 to about 25 carbon atoms and in one embodiment average about 1 to 3 unsaturated carbon to carbon bonds per acid. They may include other heteroatom functionality such as a hydroxyl group in ricinoleic acid.

In another embodiment, the C3 to C20 ketone or aldehyde containing carboxylic acid is reacted with di or poly hydroxyl functional polyol or an epoxidized version thereof such as 1) a C2-C20 linear, branched, or cyclic aliphatic alcohol; 2) a self condensation reaction product for one or more C2-C20 linear, branched, or cyclic aliphatic alcohol; 3) an C2-C4 alkoxylate extended C2-C20 linear, branched, or cyclic aliphatic alcohol; and/or 4) an C2-C4 alkoxylate extended a self condensation reaction product for one or more C2-C20 linear, branched, or cyclic aliphatic alcohol. In an embodiment, each of the above di or poly hydroxy polyols is first functionalized with two or more epoxy groups before reacting with the C3-C20 ketone or aldehyde containing carboxylic acid. In one embodiment, the C3-C20 ketone or aldehyde containing carboxylic acid is levulinic acid or pyruvic acid. In another embodiment, the C3-C20 ketone or aldehyde containing carboxylic acid is a ketone containing molecule. In embodiment 1), C2-C20 alcohol functionalized with two or more epoxy groups can be things like trimethylol propane, pentaerythritol, neopentyl glycol, etc., reacted with epichlorohydrin and then converted to epoxy group(s) by dehydrochlorination. In another embodiment, 2) a self condensation reaction product for one or more C2-C20 linear, branched, or cyclic aliphatic alcohol functionalized with two or more epoxy groups per molecule can be things like polyglycerol, dipentaerythritol, tripentaerythritol, etc., reacted with epichlorohydrin and then dehydrochlorinated. In another embodiment, 3) an C2-C4 alkoxylate extended C2-C20 linear, branched, or cyclic aliphatic alcohol functionalized with two or more epoxy groups per molecule can be things like ethoxylated, propoxylated etc., polyhydric alcohols as described under item 1, and thereafter epoxidized as set forth above. In another embodiment, 4) an C2-C4 alkoxylate extended self condensation reaction product from one or more C2-C20 linear, branched, or cyclic aliphatic alcohol functionalized with two or more epoxy groups per molecule may be things like alkoxylated dipentaerythritol that is functionalized with epoxy groups. The polyols can be the earlier hydrocarbon polyols coupled with polyisocyanate reactions. In one embodiment, it is preferred not to have multiple urethane linkages in the ketone functional molecule (i.e., to have one urethane linkage or less than one urethane linkage per ketone molecule).

For the purpose of this application, polyepoxides are molecules with two or more epoxy groups per molecule. In one embodiment, the number of hydroxyl or epoxide groups is between 2 and 20, in another embodiment between 2 and 10 and in another between 2.5 and 6. When the polyketone is made from epoxidized polyols, the epoxidized polyol is primarily used as a coupler of two or more C3-C20 ketone or aldehyde containing carboxylic acids to form a polyketone molecule. While the ketone or aldehyde containing carboxylic acids might be reactive with simple hydroxyl groups without epoxidation, the reactivity of the epoxide functional molecules is slightly higher with the carboxylic acids.

While not wishing to be bound by theory, it appears as if the reaction products of the ketone functional moieties and hydrazine functional moieties can contribute enough entanglements of high molecular weight polyurethane to the composition after film formation to give the final film more desirable properties such as increased hardness, more scratch resistant, more scuff resistance, better chemical resistance, etc. Lower molecular weight ketone containing species and lower molecular weight hydrazine moiety containing species can also improve coalescence so that films with better cohesion or requiring less coalescing aid are possible. Coalescing aids are often volatile organic compounds that may be subject to legislative reduction or elimination. While the ketone and/or hydrazine functional moieties do not need to be attached to polymer chains, the inclusion of polymer attached reactive moieties (either ketone and/or hydrazine) in combination with lower molecular weight functional moiety containing species is anticipated by this disclosure.

A preferred ketone functional molecule in one embodiment derived from triglycerides or polyesters refers to medium to high molecular weight mono of poly ketone or mono or poly aldehyde (excluding formaldehyde) reactant generally from about 500 to 50,000, in one embodiment from 500 to 20,000, and in still another embodiment from about 500 to about 5,000 or 10,000 Dalton number average molecular weight. These can be formed by any reaction mechanism as discussed later but ester linkages between the ketone containing acid and epoxidized unit are preferred and more preferred is with the epoxidized triglyceride. In one embodiment with higher molecular weight ketone molecule (e.g., above 2000 number average molecular weight), one urethane linkage or less is desirable and/or linkages from vinyl polymerization are present at concentrations of one or less per molecule.

In one embodiment where the polyketone is derived from epoxidized polyols or epoxidized alkoxylate extend polyols, the starting molecular weight of these materials can be lower than the triglycerides, the number average molecule weight of the ketone function molecule can vary from about 150 to about 50,000 Daltons, more desirably from about 150 to about 20,000, and preferably from about 150 to about 5,000 or 10,000.

The ketone or aldehyde functional groups are generally not blocked (e.g., temporarily reacted with a removable chemical moiety to avoid premature reaction), although in some embodiments it might be desirable to block some ketone or aldehyde functional groups for specific requirements.

In an earlier application, PCT/US06/004148 filed Feb. 7, 2006, a preferred ketone functional molecule refers to a low molecular weight mono or poly ketone or mono or poly aldehyde (excluding formaldehyde) reactant generally below 2000 Dalton number average molecular weight. These can be low molecular weight ketones and aldehydes, or they can be reaction products of low molecular weight ketones and aldehydes with other reactants (e.g., reacted with epoxy compounds, polyols, amines, isocyanates, etc., to build molecular weight or couple multiple ketones or aldehydes together). The chemistry to couple low molecular weight ketones and aldehydes is well known. Three viable alternatives include a) polymerizing ketone or aldehyde containing unsaturated monomers (optionally with other unsaturated monomers present), b) making higher molecular weight species by condensation reactions, or c) reactions of vinyl groups with amines (Michael addition reaction). The polymerization reaction mechanism and monomers are further set forth in U.S. Pat. No. 4,983,662 in column 13, line 59 through column 15, line 10. The condensation reaction mechanism to create higher molecular ketone or aldehyde moiety(ies) would include starting with low molecular weight ketones or aldehydes such as a) dihydroxyacetone reacted with a mono or polyisocyanate, b) react levulinic acid with diol or polyol and condense to form hydroxyl functional ketone optionally coupled with di or polyisocyanate, or c) levulinic acid (4-oxopentanoic acid) reacted with diglycidyl ether. Another Michael addition reaction is shown in U.S. Pat. No. 4,983,662 Example 2 where diethanolamine, diacetoneacrylamide are reacted in NMP to form a carbonyl-functional diol. Formaldehyde is not included in the ketone and/or aldehyde reactants because reactions between the hydrazine and formaldehyde are different than those of other aldehydes and ketones and desirably in some embodiments the aqueous dispersion of polyurethane is free of reaction products of formaldehyde and hydrazine.

In an earlier publication (WO2006/047746) crosslinkable carbonyl functional groups were incorporated into a urethane polymer backbone (page 32, under optional crosslinkable functionality). In an earlier application, PCT/US06/004148 filed Feb. 7, 2006, an epoxy resin such as a diglycidyl ether terminated resin is reacted with a carboxylic acid such as levulinic acid. In the examples of epoxy resins, the polyhydric alcohol can be selected from polyhydric phenols, aliphatic diols, cycloaliphatic diols, polyether polyols, aliphatic dicarboxylic acids, and the like obtained by reacting the polyhydric alcohol with an epihalohydrin, e.g., epichlorohydrin. In this embodiment, it mentioned that the resulting product had hydroxyl groups formed from the ring-opening of the oxirane moiety. These hydroxyl groups contain active hydrogen atoms and are co-reactive with the isocyanate groups contained in the polyisocyanate compound during the prepolymer formation and allow the pendant ketone to be polymerized into the prepolymer backbone. That embodiment is different than the current embodiment which specifically provides these similar ketone or aldehyde functional molecules after the urethane prepolymer formation such that the ketone or aldehyde functional molecule is not necessarily incorporated into the urethane prepolymer or polymer.

The polyhydric alcohols were described as phenols, including but not limited to bisphenol A (p,p'-dihydroxydiphenyl propane), resorcinol, hydroquinone, 4,4'-dihydroxybenzophenone, 4,4'-dihydroxybiphenyl and novolak resins containing more than two phenol moieties linked through methylene bridges.

Where the compositions of the invention incorporate non-polyurethanic non-vinylic polycarbonyl compound(s) and/or oligomeric urethane polycarbonyl compounds, the level of such polycarbonyl compound(s) is desirably that to provide a range of 0.05 to 20 moles carbonyl groups per mole of hydrazine (or hydrazone) groups present, more desirably 0.1 to 10 moles per mole; and preferably 0.9 to 1.5 moles per mole. Examples of suitable polycarbonyl compounds are di- or poly-ketones, di- or poly-aldehydes, and aldehyde-ketones such as glyoxal, 2,5-hexanedione, glutaric dialdehyde, succinic dialdehyde, acetyl acetone, acetonyl acetone, and acetone dicarboxylic acid ester.

The proportion of carbonyl functional groups in the free radically polymerized polymer (if such is present) is preferably 3 to 200 milliequivalents per 100 g polymer (more preferably 6 to 100 milliequivalents per 100 g polymer).

A particular chain pendant ketone functional group beyond that disclosed in U.S. Pat. No. 4,983,662 is disclosed that avoids having pH shifting basic nitrogen groups near the active carbonyl ketone group. In U.S. Pat. No. 4,982,662, Examples 2, 4, 8, 9, and 10, the authors used a reaction product of diethanolamine and diacetoneacrylamide that resulted in a basic nitrogen (e.g., where the nitrogen was only attached to adjacent atoms selected from aliphatic carbon and hydrogen and was not attached to a carbonyl group) being within 6 atoms of the ketone carbonyl group. As the ketone hydrazide reaction is pH sensitive (hindered by pH above 7 and accelerated below pH 7), it is believed that identifying chain pendant carbonyl groups (e.g., ketone or aldehyde) that either do not have basic nitrogen in the molecule or at least have the basic nitrogen separated by more than 7 atoms from the active carbonyl is desirable or possibly exclude basic nitrogen atoms in the molecule if non-polymeric or exclude basic nitrogen atoms in the lateral side chain if polymeric. The term chain pendant is used as the U.S. Pat. No. 4,982,662 reference and the reference did use dihydroxyacetone in Example 1 (which did not have a basic nitrogen nearby). Note that for the purposes of this application, nitrogen atoms attached to carbonyl groups are not considered to be undesirable basic nitrogen atoms as they have less influence on pH than the nitrogen of amines such as in the reaction of diethanylamine with diacetoneacrylamide, which is easily protonated. The Example 1 in U.S. Pat. No. 4,982,662 using dihydroxyacetone resulted in the carbon of the carbonyl group being part of the urethane polymer backbone (where it had less mobility to relocate to react with a hydrazine moiety). A chain pendant ketone functionality for the purpose of this application will be defined as a ketone functional group attached as a non-polymeric molecule or as lateral segment to a polymer backbone and where the reactive ketone group is between 1 to 5 or 10 atoms from the end of the polymer/molecule rather than being in the polymer backbone or very near to the polymer backbone. Ketone groups so positioned have more mobility to position themselves sterically to react with hydrazine moieties.

Hydrazine Functional Molecules/Oligomers (Moieties)

The preferred hydrazine functional moiety refers to a low molecular weight molecule or oligomers having one or more hydrazine or hydrazone groups. By a hydrazine functional group is meant the functional group of formula —NHNH$_2$. A hydrazone functional group is a group derived from such a hydrazine group by reaction with a monoketone or monoaldehyde containing at least 2 carbon atoms. Hydrazine functional moieties can also be dihydrazides and other polyhydrazides as expressed below in that these molecules have the specified —NHNH$_2$ group.

While hydrazine itself (H$_2$N—NH$_2$) at elevated concentrations raises concerns about worker exposure, hydrazide (—NHNH$_2$) containing molecules are less of an exposure issue and offer the opportunity to build molecular weight and/or crosslink molecules/oligomers/polymers after polyurethane dispersion coagulation/film formation at or around room temperature. Volatile amines can play a significant role in the reactions using hydrazine functional moieties as the amines are/can be used in polyurethane dispersions to adjust the pH to the basic side before coalescence and allow the pH to shift to the acid side as the water and volatile amines evaporate. This pH shift and water evaporation promotes the reaction of hydrazine groups with available ketone or aldehyde groups (providing molecular weight buildup and or crosslinking).

The hydrazine functional moieties can be prepared from lower molecular weight hydrazine/hydrazide containing moieties or they can be prepared by reacting hydrazine (H$_2$N—NH$_2$) with mono or poly a) carboxylic acids, b) ketones, or c) aldehydes. Such a reaction would be the reaction of two moles of hydrazine with adipic acid to form the dihydrazide of adipic acid. U.S. Pat. No. 4,983,662 sets forth in column 17, line 44, through column 18, line 42, other hydrazine functional moieties and their source or preparation technique. Examples of preparations and use of hydrazine functional moiety(ies) is set forth in Examples 3, 4, and 5 of the same patent.

Alternatively, the hydrazine functional moieties can be prepared from polymerizing vinyl containing monomers to form oligomers or polymers and then functionalizing said oligomers or polymers by reacting acid, ketone, or aldehyde groups with hydrazine. This is more fully set forth in U.S. Pat. No. 4,983,662 in column 15, line 11, and column 16, line 49. Therein, it uses the term-pendant hydrazinolysable groups to describe groups that can pre or post polymerization be converted to hydrazine or hydrazone groups by reacting with hydrazine (H$_2$N—NH$_2$). In this application, the hydrazine functional moiety preferable includes at least one non-polymeric (i.e., less than 2000 Dalton, more preferably less than 1000 Dalton number average molecular weight) hydrazine functional moiety.

Polymeric hydrazine and/or ketone functional polymers may be present and may co-react with the non-polymeric reactants but the polymeric versions of the ketone and hydrazine functional moieties are not required.

Suitable groups for hydrazinolysis are e.g., acid, acid halide and (especially) ester groups. The polymer VII may be a homopolymer but is more usually a copolymer of at least two monomers. Examples of monomers providing chain-pendant hydrazinolysable groups include crotonic acid, alpha-chloracrylic acid and especially acrylic acid, and acid chlorides or esters thereof, and also methacrylic acid and acid chlorides or esters thereof. There are advantageously used acrylic acid esters of alcohols of low molecular weight, such as methyl, ethyl, propyl, isopropyl, n-butyl or secondary butyl esters. As further co-monomers (not providing hydrazinolysable groups) which can be used to form hydrazine functional moieties there may be used, for example, vinyl halides such as vinyl chloride, vinyl fluoride or vinylidene chloride; vinyl-aryl-compounds such as styrene or substituted styrenes. There may also be used polymerizable olefines, such as isobutylene, butadiene or 2-chlorobutadiene, or heterocyclic compounds containing at least one vinyl group such as the various vinyl-pyridines.

When a hydrazone-containing vinyl polymer or oligomer is required, the hydrazine groups may be converted to hydrazone groups by reacting the hydrazine functional moiety with a saturated monoketone or monaldehyde containing at least two carbon atoms and preferably of boiling point 30 to 200° C. Examples of such compounds include, for example, aliphatic ketones or aldehydes, such as acetone, ethyl methyl ketone, diisopropyl ketone, etc.

A preferred hydrazine functional moiety in one embodiment refers to a low molecular weight molecule or oligomers having one or more hydrazine, hydrazide, or hydrazone groups. By a hydrazine functional group is meant the functional group of formula —NHNH$_2$. A hydrazone functional group is a group derived from such a hydrazine group by reaction with a monoketone or monaldehyde containing at least 2 carbon atoms. A typical hydrazide group might be formed by reacting a mono or polycarboxylic acid with hydrazine, or by reaction between an —NCO and hydrazine. Synthesis of hydrazine functional moiety(ies) will be discussed later.

Polyurethane Prepolymer Ingredients

The polyurethane prepolymers of this invention are formed from at least one polyisocyanate, at least one active hydrogen-containing compound and, optionally, at least one water-dispersability enhancing compound.

(i) Polyisocyanate

Suitable polyisocyanates have an average of about two or more isocyanate groups, preferably an average of about two to about four isocyanate groups per molecule and comprising about 5 to 20 carbon atoms (in addition to nitrogen, oxygen, and hydrogen) and include aliphatic, cycloaliphatic, aryl-aliphatic, and aromatic polyisocyanates, as well as products of their oligomerization, used alone or in mixtures of two or more. Diisocyanates are more preferred. Aliphatic isocyanates are preferred where UV exposure is anticipated.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable aralphatic polyisocyanates include m-tetramethyl xylylene diisocyanate, p-tetramethyl xylylene diisocyanate, 1,4-xylylene diisocyanate, 1,3-xylylene diisocyanate, and the like. A preferred aralphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, their oligomeric forms and the like. A preferred aromatic polyisocyanate is toluene diisocyanate.

(ii) Active Hydrogen-containing Compounds

Any compound that provides a source of active hydrogen for reacting with isocyanate groups via the following reaction: —NCO+H—X→—NH—C(=O)—X, can be used as the active hydrogen-containing compound in this invention. Examples include but are not limited to polyols, polythiols and polyamines.

"Polyol" in this context means any product having an average of about two or more hydroxyl groups per molecule. Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," i.e., polymeric polyols having molecular weights of at least 500 Daltons, more typically about 1,000-10,000 Daltons, or even 1,000-6,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred.

The polyester polyols typically are esterification products prepared by the reaction of organic polycarboxylic acids or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols, i.e., any compound containing the —C(=O)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HAI, Piothane 67-500 HAI, Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™. S1015-35, S1040-35, and S-1040-110 (Bayer Corporation).

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful polyhydroxy polyacetals include the compounds that can be prepared from the reaction of (A) aldehydes, such as formaldehyde and the like, and (B) glycols such as diethylene glycol, triethylene glycol, ethoxylated 4,4'-dihydroxydiphenyldimethylmethane, 1,6-hexanediol, and the like. Polyacetals can also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)ethylene diamine, N-[N-(2-aminoethyl)-2-amino-ethyl]-N'-(2-aminoethyl)-piperazine, N-(2-aminoethyl)-N'-(2-piperazinoethyl-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which are available from Huntsman Chemical Company.

Low molecular weight alkylene polyols (e.g., glycerol, trimethylol propane, etc.) can be used as urethane branching agents. Branching can provide beneficial properties to a urethane polymer and can provide additional functional (reactive) end groups (generally above 2 as one goes from a linear oligomers to a branched oligomers or polymer) for each urethane prepolymer or polymer.

(iii) Water-Dispersibility Enhancing Compounds

Polyurethanes are generally hydrophobic and not water-dispersible. In accordance with one embodiment of the invention, therefore, at least one water-dispersibility enhancing compound (i.e., monomer), which has at least one, hydrophilic (e.g., poly(ethylene oxide)), ionic or potentially ionic group is optionally included in the polyurethane prepolymer to assist dispersion of the polyurethane prepolymer as well as the chain-extended polyurethane made therefrom in water, thereby enhancing the stability of the dispersions so made. Typically, this is done by incorporating a compound bearing at least one hydrophilic group or a group that can be made hydrophilic (e.g., by chemical modifications such as neutralization) into the polymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 to about 40, or even 10 to 35 or 12 to 30 or 14 to 25. Other water-dispersibility enhancing compounds can also be reacted into the prepolymer backbone through urethane linkages or urea linkages, including lateral or terminal hydrophilic ethylene oxide or ureido units.

Water dispersibility enhancing compounds of particular interest are those which can incorporate carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxycarboxylic acids are more preferred with dimethylolproanoic acid (DMPA) being most preferred.

Water dispersibility enhancing compounds may include reactive polymeric polyol components that contain pendant anionic groups which can be polymerized into the prepolymer backbone to impart water dispersible characteristics to the polyurethane subsequent to chain extension. The term anionic functional polymeric polyol includes anionic polyester polyols, anionic polyether polyols, and anionic polycarbonate polyols. These polyols include moieties that contain active hydrogen atoms. Such polyols containing anionic groups are described in U.S. Pat. No. 5,334,690.

Another group of water-dispersibility enhancing compounds of particular interest are side chain hydrophilic monomers. Some examples include alkylene oxide polymers and copolymers in which the alkylene oxide groups have from 2-10 carbon atoms as shown, for example, in U.S. Published Patent Application No. 20030195293, the disclosure of which is incorporated herein by reference.

Other suitable water-dispersibility enhancing compounds include thioglycolic acid, 2,6-dihydroxybenzoic acid, sulfoisophthalic acid (this component would preferably be incorporated as part of a polyester), polyethylene glycol, and the like, and mixtures thereof.

(iv) Compounds Having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, urea-formaldehyde, auto-oxidative groups that crosslink via oxidization, ethylenically unsaturated groups optionally with U.V. activation, olefinic and hydrazide groups, blocked isocyanates, and the like, and mixtures of such groups and the same groups in protected forms (so crosslinking can be delayed until the composition is in its application (e.g., applied to a substrate) and coalescence of the particles has occurred) which can be reversed back into original groups from which they were derived (for crosslinking at the desired time).

Other suitable compounds providing crosslink ability include thioglycolic acid, 2,6-dihydroxybenzoic acid, and the like, and mixtures thereof.

(v) Catalysts

The prepolymer may be formed without the use of a catalyst if desired but using a catalyst may be preferred in some instances. Examples of suitable catalysts include stannous octoate, dibutyl tin dilaurate, and tertiary amine compounds such as triethylamine and bis-(dimethylaminoethyl)ether, morpholine compounds such as beta,beta-dimorpholinodiethyl ether, bismuth carboxylates, zinc bismuth carboxylates, iron (III) chloride, potassium octoate, potassium acetate, and DABCO® (diazabicyclo[2.2.2]octane), from Air Products.

A preferred catalyst is a mixture of 2-ethylhexanoic acid and stannous octoate, e.g., FASCAT®. 2003 from Elf Atochem North America.

(vi) Ingredient Proportions

Normally, the prepolymer produced in the present invention will be isocyanate-terminated. For this purpose, the ratio of isocyanate to active hydrogen in the prepolymer typically ranges from about 1.3/1 to about 2.5/1, in one embodiment from about 1.5/1 to about 2.1/1, and in another embodiment from about 1.7/1 to about 2/1.

The typical amount of water-dispersibility enhancing compound in the prepolymer will be up to about 50 wt. %, more typically from about 2 wt. % to about 30 wt. %, and more especially from about 2 wt. % to about 10 wt. % based on the total weight of the prepolymer.

The amount of optional compounds having crosslinkable functional groups in the prepolymer will typically be up to about 1 milliequivalent, preferably from about 0.05 to about 1 milliequivalent, and more preferably from about 0.1 to about 0.8 milliequivalent per gram of final polyurethane on a dry weight basis. In one embodiment the composition will be substantially free of unsaturated vegetable oils described in WO2006/047746 as oil modified polyols in paragraphs 0016 through 0025. Substantially free of can be less than 5 wt. %, desirably less than 1 wt. %, and preferably less than 0.1 or 0.01 wt. % base on the weight of the film forming components (i.e., dispersion less water and readily volatile organic solvents).

The amount of catalyst used to form the prepolymer will typically be from about 5 to about 200 parts per million of the total weight of prepolymer reactants.

The polyurethane polymer(s) and the ketone functional molecule and hydrazine functional moiety of the composition of the invention may be brought together by any suitable technique.

Where the compositions of the invention incorporates non-polyurethanic non-vinylic polyhydrazine (or polyhydrazone) compound(s) and/or oligomeric urethane polyhydrazine (or polyhydrazone) compound(s), the level of such polyhydrazine (or polyhydrazone) compounds(s) in one embodiment is that to provide a range of 0.05 to 20 moles hydrazine (or hydrazone) groups present per mole of carbonyl groups present, in another embodiment 0.1 to 10 moles per mole, and in another embodiment 0.67 to 1.11 moles per mole. Examples of such suitable polyhydrazine (or polyhydrazone) compounds include dicarboxylic acid bishydrazides of formula

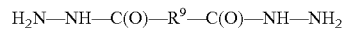

and dicarboxylic acid bis-hydrazones of formula.

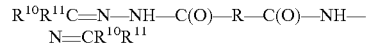

wherein $R^9$ is a covalent bond or a polyalkylene (preferably polymethylene) or alicyclic group having from 1 to 34 carbon atoms or a divalent aromatic ring, and $R^{10}$ and $R^{11}$ are selected from the group consisting of H and ($C_1$ to $C_6$) alkyl and alicyclic groups. Examples of suitable dihydrazides include oxalic acid dihydrazide, malonic acid dihydrazide, succinic acid dihydrazide, glutaric acid dihydrazide, adipic acid dihydrazide cyclohexane dicarboxylic acid bis-hydrazide, azelaic acid bis-hydrazide, and sebacic acid dihydrazide. Other suitable compounds are set forth in U.S. Pat. No. 4,983,662 at column 18, line 3 through column 18, line 42.

The compositions of the invention may optionally contain 0.0002 to 0.02 mole per mole of hydrazine group(s) of a heavy metal ion. This may be added in the form of suitable water-soluble metal salts, particularly chlorides, sulphates, metal hydrazide complexes, and acetates. Suitable heavy metal water-soluble salts are, in particular, those of Cu, Zn, Fe, Cr, Mn, Pb, V, Co and Ni.

Prepolymer Manufacture

Aqueous dispersions of polyurethane composition particles are made in accordance with this invention by forming a blend of the polyurethane prepolymer with a polyketone molecule and dispersing this blend in aqueous medium.

Typically, prepolymer formation will be done by bulk or solution polymerizing the ingredients of the prepolymer. Thus, the ingredients forming the prepolymer, e.g., the polyisocyanate(s), the active hydrogen-containing compound(s) and/or the water-dispersibility enhancing compound(s), are combined to form the prepolymer. Alternatively, the ketone functional molecules/oligomers can be combined with the prepolymer at any time during prepolymer formation, i.e., at any time during the bull/solution polymerization reaction or subsequent thereto during the dispersion forming process. The ketone functional molecule(s)/oligomer(s) nanoparticles can also be combined with the prepolymer after polymerization is substantially or even totally completed, if desired.

Bulk and solution polymerization are well known techniques and described, for example, in "Bulk Polymerization," Vol. 2, pp. 500-514, and "Solution Polymerization," Vol. 15, pp. 402-418, *Encyclopedia of Polymer Science and Engineering*, © 1989, John Wiley & Sons, New York. See, also, "Initiators," Vol. 13, pp. 355-373, Kirk-Othmer, *Encyclopedia of Chemical Technology*, © 1981, John Wiley & Sons, New York. The disclosures of these documents are also incorporated herein by reference.

In one embodiment, the ketone functional molecule(s)/oligomer) should be combined with the prepolymer and/or its reactants so that a blend or mixture, preferably an intimate admixture, of the prepolymer mass and the ketone functional molecule(s)/oligomer(s) is formed when the mixture is dispersed in water. In another embodiment, the ketone functional molecule(s) oligomer can be added separately to the dispersion.

Dispersion in an Aqueous Medium

Once the polyurethane prepolymer blend is formed, it is dispersed in an aqueous medium to form a dispersion of the blend. If the ketone functional molecule(s)/oligomer(s) are combined with the prepolymer while it is in the form of a continuous oleophilic mass rather than discrete particles or droplets in water, the dispersed particles that are formed are composed of an intimate mixture of ketone functional molecule(s)/oligomer(s) and the prepolymer.

Dispersing the prepolymer in aqueous medium can be done by any conventional technique, in the same way that other polyurethane prepolymers made by bulk or solution polymerization are dispersed in water. Normally, this will be done by combining the prepolymer blend, with water with mixing. Where solvent polymerization is employed, the solvent and other volatile components can optionally be distilled off from the final dispersion, if desired. Chain extender and/or the hydrazine functional moiety for reacting with the ketone group can be added at this stage or later.

In one embodiment of the invention, where the prepolymer includes enough water-dispersibility enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

Prepolymer Neutralization

In those instances in which the prepolymer includes water-dispersibility enhancing compounds which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extension

The polyurethane composition dispersions in water produced as described above can be used as is, if desired. Alternatively, they can be chain extended to convert the prepolymers in the composite particles to more complex polyurethanes.

As a chain extender, at least one of water, inorganic or organic polyamine having an average of about 2 or more primary and/or secondary amine groups, amine functional polyols, ureas, or combinations thereof is suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and it derivatives, and the like, and mixtures thereof. Hydrazine is most preferred or hydrazine combined with other extenders, preferably water soluble ones such as ethylene diamine and is most preferably used as a solution in water. The amount of chain extender, which can be added before or after dispersion, typically ranges from about 0.5 to about 1.1 equivalents based on available equivalents of isocyanate.

Additional Ingredients and Features

The polyurethane prepolymers, the product polyurethanes produced therefrom, and the aqueous prepolymer composition aqueous dispersions of the present invention as described above can be made with various additional ingredients and features in accordance with known polyurethane technology. Examples include:

(i) Polymer Branching

Branching of the ultimate polymer product, as well as the prepolymer, can be accomplished for aiding tensile strength and improving resistance to creep—that is, recovery to that of or near its original length after stretching. In this regard, see U.S. Published patent application No. 20030195293, the disclosure of which has been incorporated herein by reference above.

(ii) Monofunctional Active Hydrogen-Containing Compounds

The prepolymers of this invention can also be made with monofunctional active hydrogen-containing compounds to enhance dispersibility of the prepolymer in aqueous medium and impart other useful properties, for example cross-linkability, as well as to adjust the morphology and rheology of the polymer when coated onto a substrate, as also described in the above-noted U.S. Published Patent Application No. 20030195293.

(iii) Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Published Patent Application No. 20030195293.

(iv) Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, coalescents, salts, flame retardant additives (e.g., antimony oxide), antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

(v) Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020, 438, 6,017,997 and a review article by D. P. Tate and T. W. Bethea, *Encyclopedia of Polymer Science and Engineering*, Vol. 2, p. 537, the disclosures of which are incorporated herein by reference.

Similarly, the dispersions of this invention can be formed by dispersing the prepolymer mixture in a previously formed aqueous dispersion of another polymer or polymers and/or nanoparticles. In other words, the aqueous medium into which the prepolymer mixture is dispersed in accordance with the present invention can be a previously formed aqueous dispersion of another polymer or polymers including those made by emulsion and suspension polymerization techniques and/or nanoparticles (or vice versa where one would disperse another urethane into the inventive urethane dispersion).

(vi) Hybrids with Other Polymers

The aqueous dispersions of this invention can also be used as seed polymers for forming hybrids of polyurethanes with other polymers. This can be done by forming the aqueous dispersions of polyurethane composite in the manner described above and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause these monomer to polymerize when or after the prepolymer is dispersed in aqueous medium. In this approach, the ethylenically unsaturated monomers act as a diluent during prepolymer formation. In the aqueous medium, these ethylenically unsaturated monomers can be polymerized to completion with or without additional monomers being added. Hybrids of polyurethanes and acrylics can be made to advantage by this approach, as well.

This technology is taught in U.S. Pat. Nos. 4,644,030; 4,730,021; 5,137,961; and 5,371,133. Another urethane-acrylic hybrid is often known as synthetic alloy urethane-acrylic where a urethane polymer is dispersed into a waterborne polymer dispersion or emulsion. This is taught in WO 98/38249 and U.S. Pat. No. 6,022,925.

Another technique is to disperse an isocyanate prepolymer into a waterborne polyethylenic polymer dispersion as taught in WO 98/38249.

(vii) Water-Borne Energy Curable Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne polyurethane coatings.

Alternative Methods of Manufacture

Described above is a typical way the dispersions of the present invention can be made, i.e., by forming a prepolymer blend in the substantial absence of water and then dispersing the blend in an aqueous medium with mixing. Other known ways of making aqueous polyurethane dispersions can also be used to make the dispersions of this invention. Examples are (i) Shear Mixing Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

(ii) Acetone Process

A prepolymer is formed with or without the presence of acetone, MEK, and/or other polar solvents that are non-reactive and easily distilled. The prepolymer is further diluted in said solvents as necessary, and optionally chain extended with an active hydrogen-containing compound. Water is added to the (optionally chain-extended or during chain extension to control viscosity) polyurethane, and the solvents are distilled off. A variation on this process would be to chain extend the prepolymer after its dispersion into water or into water containing chain extender.

(iii) Melt Dispersion Process

An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

(iv) Ketazine and Ketimine Processes

Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

(v) Continuous Process Polymerization

An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

(vi) Reverse Feed Process

Water and optional neutralizing agent(s) and/or extender amine(s) are charged to the prepolymer under agitation. The prepolymer can be neutralized before water and/or diamine chain extenders are added.

Applications

Ketone functional molecule(s)/oligomer(s) can impart several useful properties to polymers including better film formation due to more low molecular weight components enhancing flow, higher crosslink density (improving mar and scratch resistance, barrier properties, flame retardance, chemical and stain resistance, higher tensile strength, UV stability, self assembly and so forth.

The aqueous polyurethane composite particle dispersions of the present invention, both in prepolymer and chain extended form, are useful to make coatings, adhesives, and films for porous and non-porous substrates such as papers, non-woven materials, textiles, leather, wood, concrete, masonry, metals with or without primer, plastics (e.g., polypropylene, polyester, polyurethane), house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; and personal care products such as skin care, hair care, and nail care products; livestock and seed applications; and the like. A preferred embodiment is use as a mar and scratch resistant interior or exterior coating, such as plastics coatings for vehicles and/or consumer electronics and/or wood floor coatings. As coating compositions, they may be applied by consumers or professionals by any conventional method including brushing, dipping, flow coating, spraying, and the like.

Any fibrous material can be coated, impregnated or otherwise treated with the compositions of this invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of this invention can be used as adhesives or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units.

In addition, the principles of the present invention can be applied to other technologies for manufacturing aqueous polyurethane dispersions. For example, this invention can be applied to the technique for manufacturing plasticized polyurethane dispersions described in U.S. Pat. No. 6,576,702 by adding plasticizers to the polyurethane prepolymers described in that patent before they are dispersed in aqueous medium. Similarly, this invention can be applied to the technique for manufacturing breathable polyurethane dispersions (i.e., dispersions which form layers of breathable polyurethanes) described in U.S. Published Patent Application No. 20030195293, as well as to the technique for manufacturing core-shell polyurethane dispersions described in U.S. Published Patent Application No. 20050004306. The disclosures of the above patent and published applications are incorporated herein by reference.

EXAMPLES

The following examples are presented to illustrate this invention:

Example 1

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 110° C. to 114° C. and held at this temperature for 1 hour. The temperature was then raised to 121-125° C. and held at this temperature for four hours or until the acid number was <1.0 (mg/g). The final material was clear with an emerald green tint and a viscosity of 3,800 cps at 70° C. at an acid number of 0.7 mg/g.

| Item # | Material | Parts by wt. |
| --- | --- | --- |
| 1 | Epoxidized Linseed Oil (Plasthall ELO) | 270.0 |
| 2 | Levulinic Acid | 123.4 |
| 3 | Hycat 2000 (activated Cr3+ catalyst) | 1.9 |

Example 2

Polyurethane Dispersion Containing Poly-ketone Oligomer

A prepolymer was prepared by combining items 1-3 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 102° C. to 105° C. and held at this 120 minutes or until theoretical NCO was reached as indicated by titration of a small sample. Item 4 was then added and the temperature adjusted to at 72° C. to 75° C. where item 5 was then added. The temperature was then adjusted to 84-87° C. and held there for 1 hour or until the theoretical NCO % was reached as indicated by titration of a small sample. When the prepolymer reached the theoretical NCO, the prepolymer temperature was dropped to 57-60° C. and item 6 was added and homogenized into the prepolymer. Afterwards, item 7 was added and homogenized into the prepolymer at 57-60° C. to neutralize (ionize) the prepolymer which is then dispersed shortly afterwards.

| Item # | Material | Parts by wt. |
| --- | --- | --- |
| 1 | Piothane 67-500 HNA (OH# = 223.2) | 107.3 |
| 2 | Trimethylol Propane | 2.5 |
| 3 | Di-cyclohexylmethane di-isocyanate | 176.9 |
| 4 | N-methylpyrrolidone | 87 |
| 5 | Dimethylolpropionic acid | 21.5 |
| 6 | Polyketone oligomer (from example 1) | 147.8 |
| 7 | Triethylamine | 20.2 |

The resulting neutralized prepolymer was dispersed in water having an initial temperature of ~20-22° C. while maintaining the water/dispersion temperature below 28° C. The dispersed prepolymer was extended with 16.1 parts hydrazine hydrate (35% hydrazine content) and 10 minutes afterwards with 5.6 parts of a 25% aqueous solution of ethylenediamine. The resulting polyurethane dispersion was low in sediment with a solids level of 37.6%, a viscosity of 110 cps (at 25° C.) at a pH of 7.8 with a particle size of 44.8 nm.

To 100 g of the resulting dispersion (after no detectable NCO was observed via FTIR) 1.73 parts of adipic acid dihydrazide in 9.8 parts of warm (40-50° C.) water was added. Coatings of the dispersion containing the above concentration of ADH display excellent film formation, mar resistance, black heel mark resistance and alcohol resistance after as little as 24 hrs after application at room temperature (~24° C.).

Example 3

Polyurethane-Acrylic Dispersion Containing Poly-ketone Oligomer

This example demonstrates how an NMP/co-solvent free urethane-acrylic hybrid could be prepared using similar raw materials that are employed in Example 2. A prepolymer was prepared by combining items 1-7 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this temperature for 150 minutes or until the theoretical NCO % was reached as indicated by titration of a small sample. When the prepolymer reached the theoretical NCO, the prepolymer temperature was dropped to 57-60° C. and item 8 was added and homogenized into the prepolymer. Afterwards, item 9 was added and homogenized into the prepolymer at 57-60° C. to neutralize (ionize) the prepolymer which is then dispersed shortly afterwards.

| Item # | Material | Parts by wt. |
| --- | --- | --- |
| 1 | Piothane 1000 HAI (OH# = 116.0) | 186.7 |
| 2 | Trimethylol Propane | 4.2 |
| 3 | Dimethylolpropionic acid | 35.5 |
| 4 | Methyl methacrylate | 197.2 |
| 5 | Butyl acrylate | 49.4 |
| 6 | BHT | 0.1 |
| 7 | Di-cyclohexylmethane di-isocyanate | 266.4 |
| 8 | Polyketone oligomer (from example 1) | 246.6 |
| 9 | Triethylamine | 28.9 |

A polyurethane dispersion was prepared by dispersing the neutralized prepolymer in water while maintaining the water/dispersion temperature below 28° C. The dispersed prepolymer was extended with 34.5 g of hydrazine hydrate (35% hydrazine content) and 10 minutes afterwards with 12.1 parts of a 25% aqueous solution of ethylenediamine. After allowing about 45 minutes for chain extension the temperature of the dispersion was adjusted to 33-35° C. and 0.3 parts of a 1% solution Fe-EDTA complex and 11.3 parts of aqueous 3.5% tert-butyl hydrogen peroxide is added followed by a slow addition of 19.7 parts of 2.0% aqueous erythorbic acid neutralized with triethylamine. An exotherm resulted (~8-11° C.) indicating initiation and polymerization of the acrylic monomer present. This resulted in a 42.2% solids polyurethane dispersion with low sediment, a viscosity of 220 cps (at 25° C.) at a pH of 7.8 with a particle size of 54.6 mm.

To 100 parts of the above dispersion 1.88 parts of adipic dihydrazide (ADH) was added to allow self-crosslinking between carbonyl/ketone groups in the poly-ketone oligomer. Films formed from the resulting composition cured rapidly at room temperature to provide excellent mar, black heel mark and alcohol resistance in a 24 hr dry/cure time versus the same coating without ADH which has poor to fair mar, black heel mark and alcohol resistance in the same cure time. Interestingly, despite the high hardness of the urethane-acrylic composition (Koenig (osc.)=77 after 24 hours), it forms good films at room temperature without added coalescent and has a measured MFFT of 17° C.

Example 4

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 110° C. to 114° C. and held at this temperature for 1 hour. The temperature was then raised to 121-125° C. and held at this temperature for four hours or until the acid number was <1.0 (mg/g). The final material was clear with an emerald green tint and a viscosity of ~1,800 cps at 70° C. at an acid number of 0.98 mg/g.

| Item # | Material | Parts by wt. |
|---|---|---|
| 1 | Epoxidized Soybean Oil (Jenkinol 680) | 300.8 |
| 2 | Levulinic Acid | 96.5 |
| 3 | Hycat 2000 (activated Cr3+ catalyst) | 2.0 |

Example 5

Polyurethane-Acrylic Dispersion Containing Poly-ketone Oligomer

This example demonstrates how an NMP/co-solvent free urethane-acrylic hybrid could be prepared incorporating the poly-ketone oligomer described in Example 4. A prepolymer was prepared by combining items 1-7 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this temperature for 150 minutes or until the theoretical NCO % was reached as indicated by titration of a small sample. When the prepolymer reached the theoretical NCO, the prepolymer temperature was dropped to 57-60° C. and item 8 was added and homogenized into the prepolymer. Afterwards, item 9 was added and homogenized into the prepolymer at 57-60° C. to neutralize (ionize) the prepolymer which is then dispersed shortly afterwards.

| Item # | Material | Parts by wt. |
|---|---|---|
| 1 | Piothane 1000 HAI (OH# = 116.0) | 91.9 |
| 2 | Trimethylol Propane | 2.1 |
| 3 | Dimethylol butanoic acid | 23.3 |
| 4 | Methyl methacrylate | 76.4 |
| 5 | Butyl acrylate | 19.1 |
| 6 | BHT | 0.1 |
| 7 | Di-cyclohexylmethane di-isocyanate | 145.1 |
| 8 | Polyketone oligomer (from Example 4) | 119.3 |
| 9 | Triethylamine | 17.1 |

A polyurethane dispersion was prepared by dispersing the neutralized prepolymer in water while maintaining the water/dispersion temperature below 28° C. The dispersed prepolymer was extended with 17.9 g of hydrazine hydrate (35% hydrazine content) and 10 minutes afterwards with 8.2 parts of a 25% aqueous solution of ethylenediamine. After allowing about 45 minutes for chain extension the temperature of the dispersion was adjusted to 33-35° C. and 0.2 parts of a 1% solution Fe-EDTA complex and 5.6 parts of aqueous 3.5% tert-butyl hydrogen peroxide is added followed by a slow addition of 9.8 parts of 2.0% aqueous erythorbic acid neutralized with triethylamine. An exotherm resulted (~8-11° C.) indicating initiation and polymerization of the acrylic monomer present. This resulted in a 43.3% solids polyurethane dispersion with low sediment, a viscosity of 96 cps (at 25° C.) at a pH of 7.5 with a particle size of 53.3 nm.

To 100 parts of the above dispersion 1.54 parts of adipic dihydrazide (ADH) was added to allow self-crosslinking between carbonyl/ketone groups in the poly-ketone oligomer. Films formed from the resulting composition cured rapidly at room temperature to provide very good mar, black heel mark and alcohol resistance in a 24 hr dry/cure time.

Example 6

Poly-Ketone Oligomer Synthesis

A ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally, the reaction mixture was raised to 121-125° C. and held at this temperature for three hours or until the acid number was <1.0 (mg/g). The final material had a slight amber color and a viscosity of ~2300 cps at 70° C.

| Item # | Material | Parts by wt. |
|---|---|---|
| 1 | Sorbitol polyglycidyl ether (Erisys GE-60) | 243.0 |
| 2 | Levulinic Acid | 151.3 |
| 3 | Triphenyl phosphine (TPP) | 2.5 |

Example 7

Polyurethane Dispersion Containing Poly-ketone Oligomer

A prepolymer was prepared by combining items 1-3 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 102° C. to 105° C. and held at this 120 minutes or until theoretical NCO was reached as indicated by titration of a small sample. Item 4 was then added and the temperature adjusted to at 72° C. to 75° C. where item 5 was then added. The temperature was then adjusted to 84-87° C. and held there for 1 hour or until the theoretical NCO % was reached as indicated by titration of a small sample. When the prepolymer reached the theoretical NCO, the prepolymer temperature was dropped to 57-60° C. and item 6 was added and homogenized into the prepolymer. Afterwards, item 8 was added and homogenized into the prepolymer at 57-60° C. to neutralize (ionize) the prepolymer which is then dispersed shortly afterwards.

| Item # | Material | Parts |
|---|---|---|
| 1 | Piothane 67-500 HNA (OH# = 223.2) | 107.3 |
| 2 | Trimethylol Propane | 2.5 |
| 3 | Di-cyclohexylmethane di-isocyanate | 176.9 |
| 4 | N-methylpyrrolidone (NMP) | 87 |
| 5 | Dimethylolpropionic acid | 21.5 |
| 6 | Polyketone oligomer (from Example 6) | 147.8 |
| 7 | Triethylamine | 20.2 |

The resulting neutralized prepolymer was dispersed in water having an initial temperature of ~20-22° C. while maintaining the water/dispersion temperature below 28° C. The dispersed prepolymer was extended with 16.2 parts hydrazine hydrate (35% hydrazine content) and 10 minutes afterwards with 5.7 parts of a 25% aqueous solution of ethylenediamine. This resulted in a 39.2% solids polyurethane dispersion with low sediment having a viscosity of 70 cps (at 25° C.) at a pH of 7.5° C.).

Finger nail mar was tested on coatings drawn down 5 mil wet on black Laneta paper and allowed to cure for a given time then struck full force with a finger nail flick. Black heel marking was tested by coating maple boards with 3 coats allowing 2 hours dry time between coats and allowing the coatings to cure for a given time before striking the coatings with a hard rubber object with a controllable and consistent force; after trying to wipe any resulting marking with a dry cloth. Chemical resistance was tested by coating maple boards with 3 coats allowing 2 hours dry time between coats and allowing the coatings to cure for a given time before testing; test were done by saturating a cotton ball with the chemical to maintain it on the coating for 1 hour at RT before it is removed.

Example 8

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 110° C.-114° C. and held at this temperature for 1 hour. The temperature was then raised to 123-126° C. and held at this temperature for 4.5 hours where the acid number was measured as 1.4 (mg/g). The final material was clear with an amber color and a viscosity of ~3,200 cps at 70° C. at an acid number of 1.4 mg/g.

| Item # | Material | Parts |
|---|---|---|
| 1 | Epoxidized Linseed Oil (Plasthall ELO) | 270.0 |
| 2 | Levulinic Acid | 123.4 |
| 3 | N-Methyl Imidazole | 2.5 |

Example 9

Polyurethane-Acrylic Dispersion Containing Poly-ketone Oligomer

This example demonstrates how an NMP/cosolvent free urethane-acrylic hybrid could be prepared incorporating the poly-ketone oligomer described in Example 8. A prepolymer was prepared by combining items 1-3 of the ingredients below at 60° C. to a 4 neck flask equipped with a thermometer, overhead stirrer and gas inlet. The gas inlet was used to introduce a stream of dry air into the reactor. The temperature of the reaction mixture was raised to 106° C. to 110° C. and held at this temperature for 90 minutes or until the theoretical NCO % was reached as indicated by titration of a small sample. The reactor was then cooled while items 4-6 were added to the reactor sequentially. When the reactor reached a temperature of 80-82° C. item 7 was then added. The temperature was then adjusted to 86-89° C. and held there for 50-60 minutes or until the theoretical NCO % was reached as indicated by titration of a small sample. When the prepolymer reached the theoretical NCO the prepolymer temperature was dropped to 57-60° C. and item 8 was added and homogenized into the prepolymer which is then dispersed shortly afterwards.

| Item # | Material | Parts |
|---|---|---|
| 1 | Terathane 1000 (poly-tetramethyleneglycol, OH# = 115.0) | 128.5 |
| 2 | 1,4-Cyclohexanedimethanol | 18.6 |
| 3 | Di-cyclohexylmethane di-isocyanate | 196.0 |
| 4 | BHT | 0.2 |
| 5 | Butyl acrylate | 61.2 |
| 6 | Methyl methacrylate | 33.0 |
| 7 | Dimethylolpropionic acid | 24.0 |
| 8 | Polyketone oligomer (from Example 8) | 139.5 |

A polyurethane dispersion was prepared by dispersing the neutralized prepolymer in water containing 19.2 parts of DMEA while maintaining the water/dispersion temperature below 28° C. The dispersed prepolymer was extended with 14.5 g of hydrazine hydrate (35% hydrazine content) and 10 minutes afterwards with 26.4 parts of a 25% aqueous solution of ethylenediamine. After allowing about 45 minutes for chain extension the temperature of the dispersion was adjusted to 33-35° C. and 0.2 parts of a 1% solution Fe-EDTA complex and 5.6 parts of aqueous 3.5% tert-butyl hydrogen peroxide is added followed by a slow addition of 9.8 parts of 2.0% aqueous erythorbic acid neutralized with triethylamine. An exotherm resulted (~8-11° C.) indicating initiation and polymerization of the acrylic monomer present. After completion of the acrylic polymerization adipic dihydrazide (ADH) was added to the dispersion to allow self-crosslinking between carbonyl/ketone groups in incorporated into the polymer via the carbonyl/ketone functional diol. This resulted in a 34.8% solids polyurethane dispersion with low sediment, a viscosity of 74 cps (at 25° C.) at a pH of 8.1 with a particle size of 89.3 nm.

To 100 parts of the above dispersion 1.54 parts of adipic dihydrazide (ADH) was added to allow self-crosslinking between carbonyl/ketone groups in the poly-ketone oligomer. Films formed from the resulting composition cured rapidly at room temperature and exhibited very good mar, black heel mark and alcohol resistance in a 24 hi dry/cure time period.

Comparative Example 1

Polyurethane-acrylic Dispersion Without Poly-Ketone Oligomer

A polyurethane-acrylic dispersion was prepared using a similar process and composition to that used in example 3 except that item 8 (poly-ketone oligomer from Example 1)

was not added. The resulting dispersion was low in sediment and had a viscosity of 178 cps (at 25C) at a pH of 8.2 and a solids content of 43.1%. The particle size was determined to be 60.6 mm.

Films formed from the compositions of Example 3 were compared at different levels of adipic dihydrazide (ADH) and with Comparative Example 1; the results of which are given in the table below. The data demonstrates the improved film formation obtained when the poly-ketone oligomer (PKO) of the invention is present in the composition; interestingly and unexpectedly the film formation as demonstrated in the MFFT (minimum film formation temperature) results appear to improve (decrease) when adipic dihydrazide is present. Moreover, the data demonstrates the improvement in resistance properties obtained when the PKO is contained in the dispersed polymer particle composition in conjunction with a poly-hydrazide (ADH in the present example). Solvent resistance was tested after a seven day cure at room temperature. Solvent spot tests were done using 60 minute exposure and tested afterwards using a paper towel to remove solvent using a strongly applied hand pressure down onto the spot; the spot was then rated for appearance and observed tackiness/softening.

| Composition | ADH | MFFT (without cosolvent) | Mar Resistance | BHMR: 1 d, 7 d (RT Cure) | IPA | 50% Ethanol | 70% IPA | MEK |
|---|---|---|---|---|---|---|---|---|
| Example 3 | 0.7 eq's | 11 C. | 5 | 4-5, 5 | 4-5 | 4-5 | 4-5 | 4-5 |
| Example 3 | 0.8 eq's | 13 C. | 5 | 4-5, 5 | 4-5 | 5 | 4-5 | 4-5 |
| Example 3 | None | 19 C. | 2 | 1, 2 | 3 | 3 | 2 | 3 |
| Comparative Example 1 | NA/ None | 32 C. | 2 | 1, 2 | 3 | 3-4 | 2 | 4 |

Rating:
5 = Excellent,
0 = very poor,
BHMR = Black Heel Mark Resistance

Although only a few embodiments of this invention have been described above, it should be appreciated that many modifications can be made without departing from the spirit and scope of the invention. All such modifications can be included within the scope of the invention, which is to be limited only by the following claims. Patents cited for their teachings and enablements are hereby incorporated by reference.

The invention claimed is:

1. An aqueous dispersion of polyurethane comprising:
   a) a urethane polymer or prepolymer,
   b) a ketone functional molecule derived from reacting a C3-C20 ketone or aldehyde containing carboxylic acid with 1) an epoxidized triglyceride or 2) an epoxidized polyester, said ketone functional molecule being characterized by having a number average molecular weight from about 500 to about 20,000 Daltons and having at least one ketone or aldehyde functional moiety,
   c) at least one molecule having at least one hydrazine moiety co-reactive with said ketone functional molecule, and
   d) water.

2. The dispersion of claim 1, wherein said ketone functional molecule comprises at least one poly-ketone functional moiety and said at least one molecule having at least one hydrazine moiety comprises a molecule with two or more hydrazine moieties.

3. The dispersion of claim 2, wherein said ketone functional molecule comprises the reaction product of levulinic or pyruvic acid with 1) an epoxidized vegetable oil or 2) a polyester that has been oxidatively epoxidized from an unsaturated aliphatic polyester.

4. The dispersion of claim 3, wherein said epoxidized vegetable oil comprises linseed oil or soybean oil.

5. The dispersion of claim 4, wherein said ketone functional molecule comprises at least two different ketone containing moieties and optionally includes acrylic monomers and/or polymers to form a hybrid of urethane and acrylic.

6. The dispersion of claim 2, wherein the ketone functional molecule comprises the reaction product of a C3-C20 ketone carboxylic acid with an epoxidized linseed or soybean oil.

7. The dispersion of claim 2, wherein said ketone functional molecule(s) comprise a reaction product of a C3-C20 ketone or aldehyde containing carboxylic acid with a polyester that has been oxidatively epoxidized via the reaction of an oxidizer with an unsaturated carbon to carbon bond in said polyester.

8. The dispersion of claim 2, wherein a) a portion or all of said ketone functional molecule(s) are chemically coupled into higher molecular weight species; or b) two or more triglyceride are chemically coupled, then oxidatively epoxidized, and then functionalized by reacting on one or more C3-C20 ketone or aldehyde containing carboxylic acids, optionally in a) and b) said ketone molecule includes one or less urethane linkage permolecule.

9. The dispersion of claim 2, wherein said ketone functional molecule has a number average molecular weight between about 500 and 10,000.

10. The dispersion of claim 2, wherein said urethane polymer or prepolymer has a number average molecular weight of at least 2000 Daltons and optionally has chemically attached ketone and/or hydrazine moieties.

11. The dispersion of claim 1, wherein said at least one molecule having at least one hydrazine moiety comprises a dihydrazide or polyhydrazide of a dicarboxylic acid or polycarboxylic acid.

12. A process for making an aqueous dispersion of urethane prepolymer or polymer, comprising the steps of:
   a) forming a urethane prepolymer or polymer from one or more polyol reactants and one or more isocyanate reactants,
   b) adding a ketone functional molecule derived from reacting a C3-C20 ketone or aldehyde containing carboxylic acid with 1) an epoxidized triglyceride or 2) an epoxidized polyester, said ketone functional molecule being characterized by having a number average molecular weight from about 500 to about 50,000 Daltons and having at least one ketone or aldehyde functional moiety, c) dispersing at least the urethane prepolymer or polymer in an aqueous phase as discrete particles, and d) adding a molecule having at least one hydrazine moiety co-reactive with said ketone function molecule(s) to the other components to form azomethine linkages between the ketone functional molecule(s) and said molecule having at least one hydrazine moiety.

13. The process of claim 12, wherein said ketone functional molecule is derived from reacting a C3-C20 ketone containing carboxylic acid with a) an epoxidized triglygeride or an epoxidized oligomers of one or more triglycerides.

14. The process of claim 12, wherein said urethane prepolymer or polymer is formed by bulk polymerization or solution polymerization.

15. The process of claim 12, further comprising chain extending said urethane prepolymer and optionally includes a step of adding acrylic monomers and/or acrylic polymers to form a hybrid.

16. The process of claim 15, wherein said prepolymer is chain extended in the aqueous medium.

17. The process of claim 16, wherein the ketone functional molecule is added to the prepolymer prior to dispersing into an aqueous media.

18. The process of claim 12, wherein said C3-C20 ketone containing carboxylic acid comprises levulinic acid.

19. An aqueous dispersion of polyurethane comprising:
a) a urethane polymer or prepolymer,
b) a ketone functional molecule derived from reacting a C3-C20 ketone or aldehyde containing carboxylic acid with the di or poly hydroxyl or di or poly epoxy functionalized 1) linear, branched, or cyclic aliphatic alcohol; 2) a self condensation reaction product for one or more C2-C20 linear, branched, or cyclic aliphatic alcohol; 3) an C2-C4 alkoxylate extended C2-C20 linear, branched, or cyclic aliphatic alcohol; and/or 4) an C2-C4 alkoxylate extended self condensation reaction product for one or more C2-C20 linear, branched, or cyclic aliphatic alcohol; said ketone functional molecule being characterized by having a number average molecular weight from about 150 to about 50,000 Daltons and having at least one ketone or aldehyde functional moiety,
c) at least one molecule having at least one hydrazine moiety co-reactive with said ketone functional moiety,
d) water, and
e) optionally including a di or polyamine functioning as a chain extender.

20. An aqueous dispersion according to claim, 19, wherein said ketone functional molecule has an average of from 2.5 to 6 ketone groups per molecule and optionally includes acrylic monomers and/or acrylic polymer.

* * * * *